United States Patent
Yamada et al.

(10) Patent No.: US 10,513,646 B2
(45) Date of Patent: Dec. 24, 2019

(54) RARE EARTH REGENERATOR MATERIAL PARTICLE, RARE EARTH REGENERATOR MATERIAL PARTICLE GROUP, AND COLD HEAD, SUPERCONDUCTING MAGNET, EXAMINATION APPARATUS, AND CRYOPUMP USING THE SAME

(71) Applicants: KABUSHIKI KAISHA TOSHIBA, Tokyo (JP); TOSHIBA MATERIALS CO., LTD., Yokohama-shi, Kanagawa (JP)

(72) Inventors: Katsuhiko Yamada, Kanagawa (JP); Keiichi Fuse, Kanagawa (JP)

(73) Assignees: KABUSHIKI KAISHA TOSHIBA, Tokyo (JP); TOSHIBA MATERIALS CO., LTD., Yokohama-Shi (JP)

( * ) Notice: Subject to any disclaimer, the term of this patent is extended or adjusted under 35 U.S.C. 154(b) by 0 days.

(21) Appl. No.: 16/032,713

(22) Filed: Jul. 11, 2018

(65) Prior Publication Data
US 2018/0320046 A1    Nov. 8, 2018

Related U.S. Application Data

(63) Continuation of application No. 14/680,306, filed on Apr. 7, 2015, now Pat. No. 10,047,265, which is a
(Continued)

(30) Foreign Application Priority Data

Oct. 9, 2012    (JP) ................ 2012-224522

(51) Int. Cl.
*H01L 39/00*    (2006.01)
*C09K 5/14*    (2006.01)
(Continued)

(52) U.S. Cl.
CPC ............. *C09K 5/14* (2013.01); *B22F 9/08* (2013.01); *C09K 5/08* (2013.01); *C22C 1/0425* (2013.01);
(Continued)

(58) Field of Classification Search
CPC ........................................ C09K 5/14
See application file for complete search history.

(56) References Cited

U.S. PATENT DOCUMENTS 5,186,765 A    2/1993 Arai et al.
5,449,416 A    9/1995 Arai et al.
(Continued)

FOREIGN PATENT DOCUMENTS

CN    1160442 A    9/1997
EP    0 411 591 A2    2/1991
(Continued)

OTHER PUBLICATIONS

Coon et al.: "Rare Earth Intermetallics as Catalysts for the Production of Hydrocarbons from Carbon Monoxide and Hydrogen", The Journal of Physical Chemistry, vol. 80, No. 17, pp. 1878-1879, Aug. 1, 1976.
(Continued)

*Primary Examiner* — Paul A Wartalowicz
(74) *Attorney, Agent, or Firm* — Foley & Lardner LLP

(57) ABSTRACT

A rare earth regenerator material particle and a regenerator material particle group having a high long-term reliability, and a superconducting magnet, an examination apparatus, a cryopump and the like using the same are provided. A rare earth regenerator material particle contains a rare earth element as a constituent component, and in the particle, a peak indicating a carbon component is detected in a surface region by an X-ray photoelectron spectroscopy analysis.

18 Claims, 2 Drawing Sheets

Related U.S. Application Data continuation of application No. PCT/JP2013/005987, filed on Oct. 8, 2013.

(51) Int. Cl.
  *C09K 5/08* (2006.01)
  *F17C 5/00* (2006.01)
  *H01F 6/04* (2006.01)
  *B22F 9/08* (2006.01)
  *C22C 1/04* (2006.01)

(52) U.S. Cl.
  CPC .......... *C22C 1/0441* (2013.01); *C22C 1/0491* (2013.01); *F17C 5/00* (2013.01); *H01F 6/04* (2013.01)

(56) References Cited

U.S. PATENT DOCUMENTS

| | | |
|---|---|---|
| 6,042,657 A | 3/2000 | Okamura et al. |
| 6,197,127 B1 | 3/2001 | Okamura et al. |
| 2011/0126553 A1 | 6/2011 | Ball-Difazio |
| 2012/0157320 A1 | 6/2012 | Yamada |

FOREIGN PATENT DOCUMENTS

| | | |
|---|---|---|
| EP | 0 774 522 A2 | 5/1997 |
| EP | 0 882 938 A1 | 12/1998 |
| JP | 6-017035 A | 1/1994 |
| JP | H07-027434 A | 1/1995 |
| JP | 2609747 B2 | 5/1997 |
| JP | 2003-021414 A | 1/2003 |
| JP | 2003-073661 A | 3/2003 |
| JP | 2004-075884 A | 3/2004 |
| JP | 2005-075963 A | 3/2005 |
| JP | 2005-330325 A | 12/2005 |
| JP | 2005-330325 A | 12/2005 |
| JP | 2005-336240 A | 12/2005 |
| JP | 2006-002148 A | 1/2006 |
| JP | 3769024 B2 | 4/2006 |
| JP | 2007-132655 A | 5/2007 |
| JP | 2007-302844 | 11/2007 |
| JP | 2009-103412 A | 5/2009 |
| JP | 2010-059047 A | 3/2010 |

OTHER PUBLICATIONS

Machine Translation of JP 2007-132655 (2007).
Machine Translation of JP 2007-132655 (claims) (2007).
Machine Translation of JP 2006-002148 (2006).

RARE EARTH REGENERATOR MATERIAL PARTICLE, RARE EARTH REGENERATOR MATERIAL PARTICLE GROUP, AND COLD HEAD, SUPERCONDUCTING MAGNET, EXAMINATION APPARATUS, AND CRYOPUMP USING THE SAME

CROSS-REFERENCE TO RELATED APPLICATIONS

This application is a continuation of U.S. application Ser. No. 14/680,306 filed on Apr. 7, 2015, which is a continuation of prior International Application No. PCT/JP2013/005987 filed on Oct. 8, 2013, which is based upon and claims the benefit of priority from Japanese Patent Application No. 2012-224522 filed on Oct. 9, 2012; the entire contents of all of which are incorporated herein by reference.

FIELD

Embodiments described herein relate generally to a rare earth regenerator material particle, a rare earth regenerator material particle group, and a cold head, a superconducting magnet, an examination apparatus, and a cryopump using the same.

BACKGROUND

In recent years, a superconducting technology has been remarkably developed, and various types of examination apparatus such as a Magnetic Resonance Imaging (MRI) apparatus and a Nuclear Magnetic Resonance (NMR) apparatus have been used. In order to use the superconducting technology, a cryogenic temperature of 10 K or less, and further, 4 K or less is required to be realized. In order to realize such a cryogenic temperature, a refrigerator called as a cold head is used.

There are various types of cold head such as one of Gifford-McMahon type (GM type), one of Stirling type, and one of pulse type. In any one of the types of cold head, to achieve the cryogenic temperature, a regenerator material is used by being filled in a regenerator container called as a stage of the cold head. Depending on a design of the cold head, the regenerator container sometimes has one stage, and is sometimes divided into a plurality of stages such as two stages. Helium gas is passed through this regenerator container, and a specific heat per volume of the regenerator material is utilized to obtain the cryogenic temperature.

As the regenerator material, a rare earth compound, for example, is used. For example, by adjusting a particle size and an aspect ratio of a rare earth compound of $Er_3Ni$, $HoCu_2$, or the like, a strength and a filling factor are improved, to thereby improve a performance of cold head. Further, by improving the strength of the rare earth regenerator material, it is also possible to achieve a long-term reliability of 7000 hours.

Incidentally, there is an examination apparatus such as an MRI apparatus, as a part of pieces of examination apparatus, which is controlled by being continuously operated so that an examination of a patient can be conducted at any time. A guarantee time of a general cold head is said to be about 20000 hours to 30000 hours. This is mainly because of a deterioration of refrigerating capacity of a regenerator material due to a change over time, a clogging of a regenerator container caused by a breakage of the regenerator material under the continuous operation of the cold head.

A refrigerating capacity of a cold head is designed in accordance with a capacity of a regenerator material to be used. In accordance with the refrigerating capacity of the regenerator material, a combination of regenerator materials, an amount of using the regenerator material, an amount of supplying helium gas, and the like are adjusted. In a conventional regenerator material, a change over time or a breakage occurs after an elapse of time of about 20000 hours to 30000 hours, and accordingly, a long-term reliability of the aforementioned period of time or longer has not been obtained. Further, the cold head is designed to have a high airtightness to prevent helium gas from being leaked, so that a very large burden has been imposed on a maintenance for replacing the regenerator material.

DETAILED DESCRIPTION

A rare earth regenerator material particle of an embodiment contains a rare earth element as a constituent component. In the rare earth regenerator material particle of the embodiment, a peak indicating a carbon component is detected in a surface region by an X-ray photoelectron spectroscopy analysis. A rare earth regenerator material particle group of an embodiment includes a plurality of the rare earth regenerator material particles of the embodiment. A cold head of an embodiment includes the rare earth regenerator material particle group of the embodiment. A superconducting magnet, an examination apparatus, or a cryopump of an embodiment includes the cold head of the embodiment.

Figure 1:
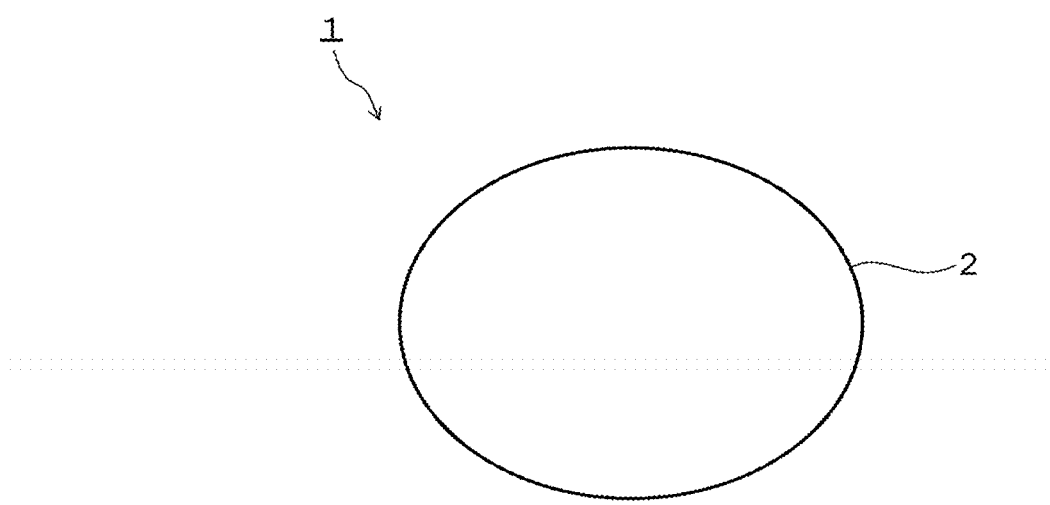
FIG. 1 is a diagram illustrating one example of a rare earth regenerator material particle of an embodiment.

FIG. 1 illustrates one example of a rare earth regenerator material particle of an embodiment.

A rare earth regenerator material particle 1 contains a rare earth element as a constituent component. The rare earth element is contained as, for example, a metal of single substance, an intermetallic compound, a metal oxide, or a metal oxysulfide. The intermetallic compound indicates, for example, a compound made of metals of two kinds or more.

The rare earth element is preferably at least one selected from Y, La, Ce, Pr, Nd, Pm, Sm, Eu, Gd, Tb, Dy, Ho, Er, Tm, Yb, and Lu.

Although FIG. 1 illustrates the rare earth regenerator material particle of spherical shape, the rare earth regenerator material particle of the present embodiment is not limited to the spherical one, but may be one of various shapes such as elliptical shape and a shape of pulverized powder. Further, an average particle size of the rare earth regenerator material particle is preferably not less than 0.1 mm nor more than 03 mm.

In the rare earth regenerator material particle 1, a peak indicating a carbon component is detected in a surface region 2 of the rare earth regenerator material particle 1 by an X-ray Photoelectron Spectroscopy (XPS) analysis. In the XPS analysis, by irradiating an X-ray to a sample surface, and measuring an energy of photoelectron to be generated, it is possible to analyze a constituent element on the sample surface and a state of electron of the constituent element.

Conditions of the XPS analysis can be exemplified as follows. A type of analyzer is Quantera SXM (manufactured by ULVAC-PHI, Inc.), a single-crystal Al—Kα is used as an X-ray source, an output is 25 W, and an analysis region φ is 100 µm. Further, it is preferable that a Pass Energy is 280.0 eV (1.0 eV/Step) for Wide Scan and is 69.0 eV (0.125 eV/Step) for Narrow Scan. Further, a geometry (an angle made by a sample surface and a detector) θ is preferably 45°. If such conditions are satisfied, the X-ray is transmitted to a position up to 1 µm from a surface of the rare earth regenerator material particle 1, so that the presence/absence of the carbon component in the surface region 2 can be detected.

The carbon component detected in the surface region 2 by the XPS analysis is not particularly limited as long as it contains carbon, but, the carbon component preferably has at least one selected from a C—C bond, a C—H bond, a C—O bond, a C=O bond, and an O—C=O bond. As the peak indicating the carbon component, a peak indicating of one component of the above may be detected, or peaks indicating components of two or more of the above may also be detected. The C—C bond or the C—H bond is collectively called as C—C/H bond. Further, the C—O bond, the C=O bond, and the O—C=O bond are collectively called as COx bond.

If a peak indicating a carbon component containing the C—C/H bond or the COx bond is detected, this means that a component containing carbon such as hydrocarbon or carbon dioxide is in a state of being adsorbed in the surface region 2 of the rare earth regenerator material particle 1.

A carbon content of the rare earth regenerator material particle 1 is preferably 100 mass ppm or less. This carbon content corresponds to an entire carbon content including the carbon component adsorbed in the surface region 2. Specifically, although the rare earth regenerator material particle of the present embodiment makes the carbon component to be adsorbed in the surface region, the carbon content of the rare earth regenerator material particle 1 is reduced as a whole.

If the carbon content of the rare earth regenerator material particle exceeds 100 mass ppm, a strength of the rare earth regenerator material particle itself is lowered. For this reason, the carbon content is preferably 100 mass ppm or less, and is more preferably 50 mass ppm or less. Further, although a lower limit value of the carbon content is not particularly limited, it is preferably 5 mass ppm or more. Note that the carbon content can be measured by, for example, a high-frequency induction heating furnace combustion-infrared absorption method.

In the regenerator operation using the rare earth regenerator material particle 1, a specific heat per volume of the rare earth regenerator material particle 1 is utilized. Therefore, in order to make helium gas (operating medium gas) to be easily brought into contact with the surface region 2 of the rare earth regenerator material particle 1, the rare earth regenerator material particle 1 is managed in an argon atmosphere or in a vacuum so that a component in the air is not adsorbed by the particle. In particular, the rare earth regenerator material particle 1 is easily oxidized, and if it is left as it is in the air over a long period, the surface region 2 is oxidized, and a function as a regenerator material is lowered.

As the helium gas, high-purity helium gas whose purity is 99.995% or more, for example, is used. As described above, although the high-purity helium gas is high-purity gas, it contains a very small amount of oxygen.

Although there is no problem if the guarantee period of the cold head is general one of about 20000 hours to 30000 hours, for example, since the cold head is oxidized little by little, a deterioration of refrigerating capacity appears as the oxidation progresses, and there arises a problem such that a period of time taken for reaching 4K increases, for example.

On the other hand, to manage the regenerator material in the argon atmosphere or in the vacuum to prevent the oxidation of the surface region 2, becomes a main cause of increasing cost.

On the contrary, in the rare earth regenerator material particle of the present embodiment, by making the carbon component having an amount at a level at which the peak indicating the carbon component is detected by the XPS analysis to be adsorbed in the surface region 2, it is possible to suppress a deterioration caused by the small amount of oxygen contained in the helium gas. For this reason, it is possible to provide a rare earth regenerator material particle which is hardly changed over time and having a high long-term reliability over 40000 hours or more, and further, over 50000 hours or more.

Further, the rare earth regenerator material particle 1 preferably contains an intermetallic compound represented by a composition formula: $RM_a$, wherein R is at least one element selected from rare earth elements, M is at least one element selected from Cu, Ni, and Co, and a is a number (atomic ratio) satisfying $0.1 \leq a \leq 4.0$. A regenerator effect provided by a specific heat per volume of the intermetallic compound, out of rare earth regenerator materials, is high.

The rare earth element R is at least one selected from Y, La, Ce, Pr, Nd, Pm, Sm, Eu, Gd, Tb, Dy, Ho, Er, Tm, Yb, and Lu. Further, "$0.1 \leq a \leq 4.0$" is a value representing an atomic weight of the M element when an atomic weight of the rare earth element R is set to 1, by an atomic weight ratio (=atomic weight of M element/atomic weight of rare earth element R).

For example, the intermetallic compound is preferably at least one selected from $HoCu_2$, $HoCu$, $Er_3Ni$, $ErNi$, and $Er_3Co$. A specific heat peak of each of these intermetallic compounds is 60 K or less, and further, 15 K or less. Further, the value of a takes 2 in $HoCu_2$, takes 1 in $HoCu$, takes 0.3 in $Er_3Ni$, takes 1 in $ErNi$, and takes 0.3 in $Er_3Co$, and accordingly, $0.1 \leq a \leq 4.0$ is satisfied in any of the above. By using the rare earth regenerator material particles 1 each containing the above-described intermetallic compound for the cold head, for example, it is possible to obtain a cryogenic temperature of 10 K or less, and further, 5 K or less.

Further, the specific heat peak of each of $HoCu_2$, $Er_3Ni$, $ErNi$, and $Er_3Co$ is 15 K or less. Therefore, $HoCu_2$, $Er_3Ni$, $ErNi$, and $Er_3Co$ are regenerator materials effective for obtaining the cryogenic temperature of 5 K or less, and further, 4 K or less.

Further, $HoCu_2$, is non-magnetic. For example, by using a non-magnetic regenerator material as a regenerator material of a cold head mounted on a superconducting magnet, the regenerator material is attracted by a magnetic force of the superconducting magnet, and a positional displacement in the cold head becomes difficult to occur, resulting in that an amount of contact between the operating medium gas (helium gas) and the regenerator material can be stabilized. Further, the specific heat peak of $HoCu_2$ is 10 K or less. Therefore, $HoCu_2$ is suitable for the regenerator material.

The specific heat peak of HoCu is 20 K to 60 K, and thus HoCu becomes a substitute of a Pb regenerator material.

When the above-described intermetallic compound is contained, it is preferable that a peak indicating a compound of the rare earth element and oxygen (R—O compound) and a peak indicating a compound of the M element and oxygen (M-O compound) are detected in the surface region 2 by the XPS analysis.

If the peak indicating the compound of the rare earth element and oxygen and the peak indicating the compound of the M element and oxygen are detected, together with the peak indicating the carbon component described above, this means that the oxygen components (the compound of the rare earth element and oxygen and the compound of the M element and oxygen) exist by being adsorbed in the surface region 2 of the rare earth regenerator material particle 1. This makes it possible to realize the rare earth regenerator material particle 1 which is further hardly changed over time and having higher long-term reliability. Note that the description that "the peak indicating the compound of the rare earth element and oxygen and the peak indicating the compound of the M element and oxygen are detected" also includes a case where a peak indicating a compound of rare earth element-M element-oxygen is detected.

In the rare earth regenerator material particle 1, it is preferable that a ratio (A/B) of an amount (atomicity) A of the rare earth element in the compound of the rare earth element and oxygen to an amount (atomicity) B of the M element in the compound of the M element and oxygen detected in the surface region 2 by the XPS analysis exceeds the value of a.

If the (A/B) exceeds the value of a, this indicates that the intermetallic compound RMa of the rare earth regenerator material particle 1 is not oxidized as it is, and the rare earth element R is oxidized greater than the M element. Further, it is preferable that the (A/B) exceeds a value of 2a. The intermetallic compound is a compound which is originally easily oxidized. By creating a state where the rare earth element is oxidized somewhat greater than the M element (a state where the (A/B) exceeds the value of a), it is possible to suppress the progress of oxidation in the surface region 2 of the rare earth regenerator material particle 1. In particular, when the (A/B) exceeds the value of 2a, it is possible to further suppress the progress of oxidation.

Note that in the measurement of the value of A and the value of B described above, it is preferable to use semi-quantification by the XPS analysis. There is no problem even if a semi-quantitative analysis method is employed to determine the ratio between the value of A and the value of B. It is of course possible to determine the (A/B) by conducting a qualitative analysis or a quantitative analysis of the compound of the rare earth element and oxygen and the compound of the M element and oxygen, by using a Transmission Electron Microscope (TEM) or the like.

Here, explanation will be made on a case where $HoCu_2$ is used as the regenerator material particle.

In the regenerator material particle containing $HoCu_2$ (which is also referred to as $HoCu_2$ regenerator material particle), it is preferable that a peak indicating a compound of holmium (Ho) and oxygen (O) (Ho—O compound), and a peak indicating a compound of copper (Cu) and oxygen (O) (Cu—O compound) are detected in the surface region 2 of the regenerator material particle 1 by the XPS analysis. Conditions of the XPS analysis can be set to conditions same as those when analyzing the carbon component.

If the peak indicating the compound of holmium (Ho) and oxygen (O) and the peak indicating the compound of copper (Cu) and oxygen (O), other than the peak indicating the carbon component, are detected, this mean that oxygen is adsorbed in the surface region 2, and each of holmium or copper and oxygen forms the compound, and the compound exists in an amount at a level at which the peak of the compound can be detected. By creating such a state, it is possible to further suppress the oxidation at a time of using the cold head in which the regenerator material particles are filled, and it is possible to make the cold head to be hardly changed over time. Further, the compound of holmium (Ho) and oxygen (O) is not particularly limited as long as it has the Ho—O bond. Further, the compound of copper (Cu) and oxygen (O) is also not particularly limited as long as it has the Cu—O bond. Further, it is also possible that a compound of holmium (Ho), copper (Cu), and oxygen (O) (Ho—Cu—O compound) is contained in the $HoCu_2$ regenerator material particle.

It is preferable that a ratio (A/B) of an amount (atomicity) A of holmium (Ho) in the compound of holmium (Ho) and oxygen (O) to an amount (atomicity) B of copper (Cu) in the compound of copper (Cu) and oxygen (O) exceeds 0.5. At this time, in the $HoCu_2$ regenerator material particle, each of the compound of holmium (Ho) and oxygen (O) and the compound of copper (Cu) and oxygen (O) exists in an amount at a level at which the peak can be detected.

Out of the intermetallic compounds of holmium (Ho) and copper (Cu), $HoCu_2$ is a stable compound. In the regenerator material main body, an atomicity ratio of copper (Cu) to holmium (Ho) is 2 to 1. If the A/B exceeds 0.5, this means that $HoCu_2$ being the stable compound is not oxidized as it is, and holmium is somewhat preferentially bonded with oxygen to form the compound. Metal holmium and metal copper are respectively metals which are easily oxidized. Particularly, a speed of oxidation of metal holmium is faster than that of metal copper. For this reason, by previously forming the compound of holmium (Ho) and oxygen (O), it is possible to suppress a further oxidation, which enables the regenerator material to be hardly changed over time.

It is preferable that the ratio (A/B) of the amount (atomicity) A of holmium (Ho) in the compound of holmium (Ho) and oxygen (O) to the amount (atomicity) B of copper (Cu) in the compound of copper (Cu) and oxygen (O) is 1.0 or more. By previously making holmium to be oxidized greater than copper, the regenerator material is made to be hardly changed over time, and after filling the rare earth regenerator material particles in the cold head, it is possible to prevent the oxidation due to the very small amount of oxygen contained in the helium gas. Further, the (A/B) is preferably not less than 1.0 nor more than 5.0. If the value of (A/B) is large to be greater than 5.0, a large amount of holmium (Ho) is oxidized too much, resulting in that the regenerator performance originally possessed by the $HoCu_2$ regenerator material particle easily deteriorates.

Note that in the measurement of the value of A and the value of B described above, it is preferable to use the semi-quantification by the XPS analysis. There is no problem even if the semi-quantitative analysis method is employed to determine the ratio between A and B. It is of course possible to determine the value of (A/B) by conducting the qualitative analysis and the quantitative analysis of the Ho—O compound and the Cu—O compound, by using the TEM or the like.

In the $HoCu_2$ regenerator material particle, a reflectance of light with a wavelength of 600 nm is preferably 20% or more, more preferably 25% or more, and further, a reflectance of light with a wavelength of 800 nm is preferably 26% or more.

If the reflectance of light with the wavelength of 600 nm of the $HoCu_2$ regenerator material particle is 20% or more, this means that a surface region of the $HoCu_2$ regenerator material particle is in a slightly oxidized state in which it is not oxidized more than necessary. When the surface region is in the slightly oxidized state, the regenerator effect originally possessed by the $HoCu_2$ regenerator material particle ($HoCu_2$ regenerator material particle whose surface region is not oxidized) can be maintained. In addition to that, since the regenerator material is made to be hardly changed over time, it is possible to maintain the regenerator function over 40000 hours or more, and further, 50000 hours or more.

A reflectance of light on a long wavelength side of the wavelength of 600 nm or more becomes very high, when compared to a reflectance in a case of providing a thick oxide film. Therefore, it is preferable to perform the measurement based on the reflectance of light with the wavelength of 600 nm. Further, although an upper limit of the reflectance is not particularly limited, the upper limit is preferably 33% or less regarding the light with the wavelength of 600 nm, and is preferably 38% or less regarding the light with the wavelength of 800 nm.

Note that in the measurement of reflectance, a regenerator material is filled in a measuring container with a diameter of 28 mm and a height of 4 mm, for example, the light with the wavelength of 600 nm is irradiated, and a diffuse reflectance of the light is measured.

The above is the explanation when using the HoCu, regenerator material particles.

Further, it is also possible to use a rare earth regenerator material particle group including a plurality of the rare earth regenerator material particles of the present embodiment, for a cold head. Each of FIG. 2 and FIG. 3 illustrates an example of a cold head including a plurality of regenerator material particle groups.

Figure 2:
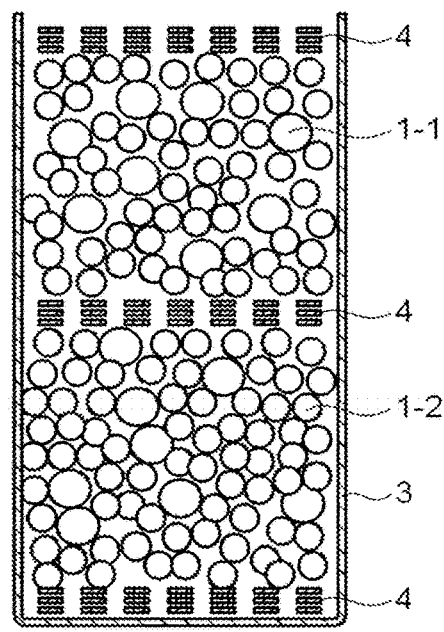
FIG. 2 is a diagram illustrating one example of a cold head of an embodiment.
Figure 3:
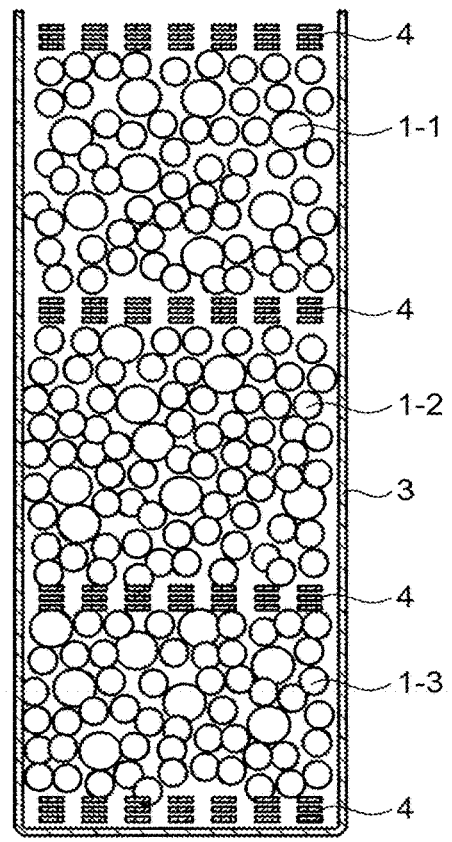
FIG. 3 is a diagram illustrating another example of the cold head of the embodiment.

A cold head illustrated in FIG. 2 includes a first regenerator material particle group 1-1, a second regenerator material particle group 1-2, a regenerator container 3, and metal mesh materials 4. Further, a cold head illustrated in FIG. 3 includes a first regenerator material particle group 1-1, a second regenerator material particle group 1-2, a third regenerator material particle group 1-3, a regenerator container 3, and metal mesh materials 4.

There are various types of cold head such as a Gifford-McMahon type (GM type) cold head, a Stirling type cold head, and a pulse type cold head. In any one of the types of cold head, it is possible to achieve a cryogenic temperature of 10 K or less, and further, 4 K or less.

In order to achieve the cryogenic temperature, it is required to fill regenerator materials in regenerator containers called as a first stage and a second stage. For example, FIG. 3 in JP-B 3769024 illustrates one example of a GM type cold head. In FIG. 3 in JP-B 3769024, a copper mesh material is filled in a first stage (first regenerator container), and rare earth regenerator material particles such as $HoCu_2$ regenerator material particles are filled in a second stage (second regenerator container).

Regenerator material particles are filled in a cold head sequentially from the particles with higher specific heat peak temperature, to thereby realize the cryogenic temperature. In recent years, a two-layer type in which a plurality of regenerator material-filled layers are formed in a second stage via the metal mesh materials 4 to provide a regenerator material-filled layer having the first regenerator material particle group 1-1 filled therein and a regenerator material-filled layer having the second regenerator material particle group 1-2 filled therein, as illustrated in FIG. 2, and a three-layer type in which a regenerator material-filled layer having the first regenerator material particle group 1-1 filled therein, a regenerator material-filled layer having the second regenerator material particle group 1-2 filled therein, and a regenerator material-filled layer having the third regenerator material particle group 1-3 filled therein are provided as illustrated in FIG. 3, have been mainstreams. It is of course possible to employ a single-layer type, or a type of four layers or more.

When the second stage has a plurality of regenerator material-filled layers, at least one of the plurality of regenerator material-filled layers is provided with the rare earth regenerator material particle group of the present embodiment. For example, when the two-layer type is employed, there can be cited a combination in which the first regenerator material particle group uses a lead regenerator material particle group, and the second regenerator material particle group uses the rare earth regenerator material particle group of the present embodiment, and thus different types of regenerator material particle groups are respectively filled, a combination in which the first regenerator material particle group uses the rare earth regenerator material particle group of the present embodiment, and the second regenerator material particle group uses a gadolinium oxysulfide regenerator material particle group, and the like. Further, when the three-layer type is employed, there can be cited a combination in which the first regenerator material particle group uses the lead regenerator material particle group, the second regenerator material particle group uses the rare earth regenerator material particle group of the present embodiment, and the third regenerator material particle group uses the gadolinium oxysulfide regenerator material particle group, and the like.

When the two-layer type is employed, the regenerator material particle group with higher specific heat peak temperature is set to the first regenerator material particle group, and the regenerator material particle group with lower specific heat peak temperature is set to the second regenerator material particle group, and thus the regenerator material particle groups are set to be combined so that the specific heat peak temperature is sequentially lowered.

Note that it is also possible to use, instead of the lead regenerator material particle, the rare earth regenerator material particle of $HoCu_2$, $Er_3Ni$, ErNi, $Er_3Co$ or the like.

When the partition is conducted by using the metal mesh materials 4, it is preferable that the regenerator material particle groups are filled in respective regenerator material-filled layers, and the metal mesh materials 4 are pressed so that the filling is conducted to eliminate a gap between the metal mesh materials 4 and the regenerator material particle groups as much as possible. If there is a gap between the metal mesh materials 4 and the regenerator material particle groups, there is a possibility that the regenerator material moves within the regenerator material-filled layer to be broken due to a vibration during an operation of the cold head, a pressure of helium gas and the like.

When at least one of the regenerator material-filled layers uses the rare earth regenerator material particle group of the present embodiment, it is preferable that 90% or more (number proportion) of the rare earth regenerator material particles to be filled are the rare earth regenerator material particles of the present embodiment. If the proportion of the rare earth regenerator material particles of the present embodiment is less than 90% of the rare earth regenerator material particles to be filled, this means that a component other than the rare earth regenerator material particles of the present embodiment is contained in a proportion of greater than 10%.

In the rare earth regenerator material particle other than that of the present embodiment, the carbon component does not exist on its surface region, so that the rare earth regenerator material particle is oxidized by the small amount of oxygen contained in the helium gas. Accordingly, when the oxidation progresses, the refrigerating capacity deteriorates.

On the contrary, in the rare earth regenerator material particle of the present embodiment, the carbon component exists on its surface region, so that the oxidation caused by the very small amount of oxygen can be suppressed. Therefore, the initial refrigerating capacity can be maintained over a long period. From a point of view of preventing the oxidation caused by the very small amount of oxygen, it is preferable that 95% or more of the rare earth regenerator material particle group, and further, 100% of the rare earth regenerator material particle group is formed of the rare earth regenerator material particles of the present embodiment.

When a circumferential length of a projected image of the rare earth regenerator material particle configuring the rare earth regenerator material particle group is set to L, and an actual area of the projected image is set to A, a proportion of the rare earth regenerator material particle in which a form factor R represented by $L^2/4\pi A$ exceeds 1.5 is preferably 5% or less. Further, a proportion of magnetic regenerator material particle in which the form factor R exceeds 1.5 is preferably 5% or less, more preferably 2% or less, and still more preferably 0%. Even if the particle is seemingly sphere, when a large number of very small concave and convex exist on the surface region, the form factor R sometimes exceeds 1.5. If the form factor R is 1.5 or less, this means that the surface is smooth.

In order to fill the rare earth regenerator material particles so as not to generate an unnecessary gap between the metal mesh materials 4 and the rare earth regenerator material particle group, it is preferable that a small vibration is applied to the regenerator container 3 to perform filling so that the gap between the rare earth regenerator material particles becomes as small as possible, and thereafter, the metal mesh materials 4 are pressed against the particles while applying a stress, and the materials are fixed. As described above, in order to efficiently fill the rare earth regenerator material particle group, there is a need to apply the vibration and the stress. For this reason, the rare earth regenerator material particle group is also required to have a mechanical strength. As one of methods of improving the mechanical strength of the rare earth regenerator material particle, there can be cited a method of making the form factor R to be 1.5 or less. By eliminating the very small concave and convex on the surface, it is possible to improve the mechanical strength.

The form factor R of each particle of the rare earth regenerator material particle group is preferably 1.2 or less.

The rare earth regenerator material particle and the rare earth regenerator material particle group using the same as described above are excellent in the refrigerating capacity, and in addition to that, it is possible to suppress the deterioration of refrigerating capacity over a long period of 40000 hours or more. Therefore, a cold head including the rare earth regenerator material particle group of the present embodiment has a high long-term reliability.

By using the cold head of the present embodiment for a superconducting magnet, an examination apparatus, a cryopump and the like, it is possible to obtain a long-term reliability. As the examination apparatus, an MRI apparatus, an NMR apparatus and the like can be cited. For example, the MRI apparatus is a medical equipment which can take a photograph of human body in vertical and horizontal directions by utilizing a magnetism. Presently, the MRI apparatus can obtain a clear image at a level of equal to or greater than that of an X-ray Computed Tomography (CT) apparatus, and is used for angiography, and for photographing to check the presence/absence of aneurism in the brain or brain tumor. The photographing in the MRI apparatus is conducted not only in a routine checkup but also in an emergency medical examination, as a matter of course. For this reason, there is a need to make the MRI apparatus to be constantly operated so that it is possible to perform photographing at any time. In order to make the MRI apparatus to be constantly operated, it is required to make a superconducting magnet for obtaining the cryogenic temperature and a cold head mounted on the magnet to be in an operation state. If the cold head of the present embodiment is employed, since the deterioration due to the oxidation of the rare earth regenerator material particle group is suppressed, it is possible to maintain the refrigerating capacity over, not a conventional guarantee period of about 20000 hours to 30000 hours, but a long period of 40000 hours or more, and further, 50000 hours to 60000 hours. Therefore, a continuous operation of 40000 hours or more can be made possible.

Next, a manufacturing method of the rare earth regenerator material particles will be described. Although the manufacturing method of the rare earth regenerator material particles of the present embodiment is not particularly limited, the following method can be cited as a method of efficiently obtaining the particles. Here, as one example of the manufacturing method of the rare earth regenerator material particles, a manufacturing method of the $HoCu_2$ regenerator material particles will be described.

First, a $HoCu_2$ molten metal having a desired composition ratio is prepared. At this time, it is preferable that the $HoCu_2$ molten metal is melted for 5 hours or more to remove an impurity gas component.

Next, the $HoCu_2$ molten metal is turned into particles by using a rapid cooling solidification method such as a Rotary Disc Process (RDP). $HoCu_2$ regenerator material particles obtained by making the molten metal to be turned into particles, are classified based on form, so that a proportion of particles each of which has the form factor R of greater than 1.5 becomes 5% or less.

Next, a process of making the carbon component to be adsorbed is conducted. In the process of making the carbon component to be adsorbed, the $HoCu_2$ regenerator material particles are exposed to an atmosphere containing carbon dioxide or a hydrocarbon component. As the atmosphere containing carbon dioxide or the hydrocarbon component, there can be cited an air atmosphere, and an inert atmosphere (argon gas or the like) containing carbon dioxide or hydrocarbon. Further, since the air contains oxygen, the process of making the carbon component to be adsorbed and a process of causing the slight oxidation can be conducted at the same time. As the hydrocarbon component, there can be cited methane, ethane or the like.

Note that for shortening the process of making the carbon component to be adsorbed and the process of causing the slight oxidation, it is effective to conduct heating at 110° C. or less. As a rough standard of a heating time, there can be cited 2 hours or less when the heating is conducted at 70° C. or more and 110° C. or less, 5 hours or less when the heating is conducted at 30° C. or more and less than 70° C., and 10 hours or less when the heating is conducted at less than 30° C.

The heating time is set in accordance with an amount of carbon component contained in the atmosphere gas, and an amount of regenerator material particles to be processed at a time. Further, in order to stabilize the carbon adsorption state and the slight oxidation state in each regenerator material particle, it is preferable to perform heating while stirring the atmosphere gas in which the regenerator material particles are placed.

The above is the explanation of the manufacturing method of the rare earth regenerator material particles.

Although $HoCu_2$ is exemplified in this case, when another rare earth regenerator material particle is employed, it is possible to manufacture the rare earth regenerator material particles through a similar process of making the carbon component to be adsorbed, a similar process of causing the slight oxidation and the like.

EXAMPLES

Example 1 to Example 3, Comparative Example 1, Reference Example 1

$HoCu_2$ regenerator material particle groups each having an average particle size of about 250 μm and a particle size distribution of 150 μm to 300 μm were prepared. In each of the prepared $HoCu_2$ regenerator material particle groups, a proportion of particle whose form factor R exceeded 1.5 was 0%, and the form factor R of all of particles was 1.2 or less. Next, in the example 1 to the example 3, and the reference example 1, a process presented in Table 1 was conducted as a carbon component adsorption process. The carbon component adsorption process was conducted simultaneously with a slight oxidation process, and was conducted while stirring atmosphere gas. Note that in the comparative example 1, the carbon component adsorption process was not conducted.

TABLE 1

| | Carbon component adsorption process |
|---|---|
| Example 1 | In the air, 100° c. × 1 hour |
| Example 2 | In the air, 50° c. × 2 hours |
| Example 3 | In gas containing 2 volume % of methane, 10 volume % of oxygen, and balance of Ar, 60° c. × 1 hour |
| Comparative Example 1 | Not conducted |
| Reference Example 1 | In the air, 200° c. × 3 hours |

The XPS analysis was performed on each of the obtained $HoCu_2$ regenerator material particle groups, and the presence/absence of peak indicating the carbon component, the presence/absence of peak indicating a Ho—O compound, and the presence/absence of peak indicating a Cu—O compound in a surface region, were examined. In the XPS analysis, a type of analyzer was set to Quantera SXM (manufactured by ULVAC-PHI, Inc.), a single-crystal AlKα was used as an X-ray source, an output was set to 25 W, and an analysis region ϕ was set to 100 μm. Further, a Pass Energy was set to 280.0 eV (1.0 eV/Step) for Wide Scan and 69.0 eV (0.125 eV/Step) for Narrow Scan, and a geometry (an angle made by a sample surface and a detector) θ was set to 45°.

Further, a semi-quantitative analysis of the XPS analysis was used to determine a ratio of an amount (atomicity) A of holmium (Ho) in the Ho—O compound to an amount (atomicity) B of copper (Cu) in the Cu—O compound (A/B).

Further, a carbon content of the entire $HoCu_2$ regenerator material particle was measured by a high-frequency induction heating furnace combustion-infrared absorption method. Results thereof are presented in Table 2.

TABLE 2

| | Xps analysis | | | | |
|---|---|---|---|---|---|
| | Presence/absence of peak indicating carbon component | Presence/absence of peak indicating Ho—O compound | Presence/absence of peak indicating Cu—O compound | A/B | Carbon content (mass ppm) |
| Example 1 | Presence | Presence | Presence | 3.7 | 32 |
| Example 2 | Presence | Presence | Presence | 3.2 | 32 |
| Example 3 | Presence | Presence | Presence | 2.5 | 30 |
| Comparative Example 1 | Absence | Absence | Absence | — | 25 |
| Reference Example 1 | Presence | Presence | Presence | 3.9 | 120 |

As a result of the XPS analysis, the peak indicating the carbon component was detected in the $HoCu_2$ regenerator material particles of the example 1 to the example 3, and the reference example 1. The detected peak indicating the carbon component indicated any one kind or more of a C—C bond, a C—H bond, a C—O bond, a C=O bond, and an O—C=O bond.

Further, a reflectance of light of the $HoCu_2$ regenerator material particles was measured. Here, the $HoCu_2$ regenerator material particle group of each of the example 1 to the example 3, the comparative example 1, and the reference example 1 was prepared and filled in a measuring container (with a diameter of 28 mm and a height of 4 mm). To the formed sample to be measured, light with a wavelength of 600 nm or a wavelength of 800 nm was irradiated, and a diffuse reflectance of the light was measured. Results thereof are presented in Table 3.

TABLE 3

| | Reflectance | |
|---|---|---|
| | Wavelength of 600 nm | Wavelength of 800 nm |
| Example 1 | 30% | 34% |
| Example 2 | 28% | 32% |
| Example 3 | 26% | 30% |
| Comparative Example 1 | 35% | 39% |
| Reference Example 1 | 17% | 23% |

Next, cold heads were formed by using the $HoCu_2$ regenerator material particles of the respective example 1 to example 3, comparative example 1, and reference example 1. In each of the cold heads, a copper mesh material was filled in a first stage, and a lead regenerator material particle group as a first regenerator material particle group, and the $HoCu_2$ regenerator material particle group of each of the example 1 to the example 3, the comparative example 1, and the reference example 1 as a second regenerator material particle group, were filled in a second stage. Further, copper mesh materials were used to partition the second stage. Note that when the $HoCu_2$ regenerator material particles were filled in the second stage, the filling was performed while applying a vibration so that a gap between the $HoCu_2$ regenerator material particles was not unnecessarily enlarged. Further, the copper mesh materials in the second stage were pushed-in at a stress of 3 MPa to be fixed. Through this operation, each of the cold heads was formed. Each of the cold heads was continuously operated for 40000 hours to 60000 hours, and the presence/absence of deterioration of refrigerating capacity was examined. Results thereof are presented in Table 4.

TABLE 4

|  | Refrigerating capacity (w) | | |
| --- | --- | --- | --- |
|  | Initial stage | After 40000 hours | After 60000 hours |
| Example 1 | 3.4 | 3.3 | 3.2 |
| Example 2 | 3.4 | 3.3 | 3.2 |
| Example 3 | 3.4 | 3.3 | 3.2 |
| Comparative Example 1 | 3.4 | 3.2 | 2.9 |
| Reference Example 1 | 2.8 | 2.8 | 2.8 |

In each of the cold heads related to the example 1 to the example 3, and the reference example 1, the deterioration of refrigerating capacity was suppressed. Further, when the $HoCu_2$ regenerator material particle group was taken out from each of the cold heads after being operated for 60000 hours, and a color of surface thereof was checked, in the comparative example 1 and the reference example 1, the color of surface was changed to dark brown. On the contrary, in the example 1 to the example 3, the color of surface was slightly deep greenish brown, and a large change of color was not confirmed.

In the example 1 to the example 3, even after the elapse of time of 60000 hours, a proportion of crushed $HoCu_2$ regenerator material particle was 0.5 mass % or less, and accordingly, the strength was also sufficiently maintained. Further, in the reference example 1, although the refrigerating capacity did not deteriorate, the initial value thereof was low.

As described above, in the cold heads related to the example 1 to the example 3, it was confirmed that the long-term reliability was greatly improved. For this reason, it can be understood that it is possible to greatly improve the long-term reliability of a superconducting magnet, and various types of apparatus such as an examination apparatus and a cryopump each having the cold head mounted thereon.

Example 4 to Example 7

Rare earth regenerator material particle groups each having an average particle size of about 250 μm and a particle size distribution of 150 μm to 300 μm were prepared. In each of the prepared rare earth regenerator material particle groups, a proportion of particle whose form factor R exceeded 1.5 was 0%, and the form factor R of all of particles was 1.2 or less. Next, a process presented in Table 5 was conducted as the carbon component adsorption process. Note that the carbon component adsorption process was set to include the slight oxidation process, and conducted while stirring atmosphere gas. Further, materials of the rare earth regenerator material particles in the respective examples are also presented in Table 5.

TABLE 5

|  | Rare earth regenerator material particle | Carbon component adsorption process |
| --- | --- | --- |
| Example 4 | $Er_3Ni$ | In the air, 90° c. × 1 hour |
| Example 5 | ErNi | In the air, 60° c. × 1.5 hours |
| Example 6 | $Er_3Co$ | In gas containing 2 volume % of methane, 10 volume % of oxygen, and balance of Ar, 60° c. × 1 hour |
| Example 7 | HoCu | In the air, 25° c. × 8 hours |

The XPS analysis was performed on each of the obtained rare earth regenerator material particle groups, and the presence/absence of peak indicating the carbon component, the presence/absence of peak indicating an R—O compound, and the presence/absence of peak indicating an M-O compound in a surface region, were examined. In the XPS analysis, a type of analyzer was set to Quantera SXM (manufactured by ULVAC-PHI, Inc.), a single-crystal AlKα was used as an X-ray source, an output was set to 25 W, and an analysis region ϕ was set to 100 μm. Further, a Pass Energy was set to 280.0 eV (1.0 eV/Step) for Wide Scan and 69.0 eV (0.125 eV/Step) for Narrow Scan, and a geometry (an angle made by a sample surface and a detector) θ was set to 45°.

Further, a semi-quantitative analysis of the XPS analysis was used to determine a ratio of an amount (atomicity) A of the rare earth element in the R—O compound to an amount (atomicity) B of the M element in the M-O compound (A/B).

Further, a carbon content was determined by the high-frequency induction heating furnace combustion-infrared absorption method. Results thereof are presented in Table 6.

TABLE 6

|  | Xps analysis | | | | |
| --- | --- | --- | --- | --- | --- |
|  | Presence/absence of peak indicating carbon component | Presence/absence of peak indicating R—O compound | Presence/absence of peak indicating M—O compound | A/B | Carbon content (mass ppm) |
| Example 4 | Presence | Presence | Presence | 4.1 | 45 |
| Example 5 | Presence | Presence | Presence | 2.7 | 40 |
| Example 6 | Presence | Presence | Presence | 4.8 | 33 |
| Example 7 | Presence | Presence | Presence | 1.6 | 38 |

As a result of the XPS analysis, the peak indicating the carbon component was detected in the example 4 to the example 7. The peak indicating the carbon component indicated any one kind or more of the C—C bond, the C—H bond, the C—O bond, the C=O bond, and the O—C=O bond.

Next, cold heads were formed by using the rare earth regenerator material particle groups related to the respective example 4 to example 7.

In each of the cold heads related to the example 4 to the example 6, a copper mesh material was filled in a first stage, and a lead regenerator material particle group as a first regenerator material particle group, and the rare earth regenerator material particle group related to each of the example 4 to the example 6 as a second regenerator material particle group, were filled in a second stage.

In the cold head related to the example 7, a copper mesh material was filled in a first stage, and the rare earth regenerator material particle group related to the example 7 as a first regenerator material particle group, and the rare earth regenerator material particle group related to the example 1 as a second regenerator material particle group, were filled in a second stage.

Note that copper mesh materials were used to partition the second stage. Further, when the regenerator material particle groups were filled in the second stage, the filling was performed while applying a vibration so that a gap between the rare earth regenerator material particles was not unnecessarily enlarged. Further, the copper mesh materials in the second stage were pushed-in at a stress of 3 MPa to be fixed. Through this operation, each of the cold heads was formed. Each of the cold heads was continuously operated for 40000 hours to 60000 hours, and the presence/absence of deterioration of refrigerating capacity was examined. Results thereof are presented in Table 7.

TABLE 7

| | Refrigerating capacity (w) | | |
|---|---|---|---|
| | Initial stage | After 40000 hours | After 60000 hours |
| Example 4 | 3.4 | 3.2 | 3.0 |
| Example 5 | 3.4 | 3.2 | 3.0 |
| Example 6 | 3.4 | 3.1 | 3.0 |
| Example 7 | 3.4 | 3.3 | 3.2 |

In each of the cold heads related to the example 4 to the example 7, the deterioration of refrigerating capacity was suppressed. Further, in each of the cold heads related to the example 4 to the example 7, even after the elapse of time of 60000 hours, a proportion of crushed rare earth regenerator material particle was 0.8 mass % or less, and accordingly, the strength was also sufficiently maintained.

As described above, in the cold heads related to the example 4 to the example 7, it was confirmed that the long-term reliability was greatly improved. For this reason, it can be understood that it is possible to greatly improve the long-term reliability of a superconducting magnet, and various types of apparatus such as an examination apparatus and a cryopump each including the cold head related to each of the example 4 to the example 7.

What is claimed is:

1. A method for manufacturing a cold head, comprising:
preparing at least one regenerator container; and
filling a plurality of regenerator material particle groups which are different types in the regenerator container,
wherein a generator material particle constituting at least one of the plurality of regenerator material particle groups is a rare earth generator material particle comprising a rare earth element as a constituent component,
a peak indicating a carbon component and a peak indicating a compound containing the rare earth element and oxygen are detected in a surface region of the rare earth generator material particle by an X-ray photoelectron spectroscopy analysis,
an entire content of carbon in the rare earth generator material particle including the carbon component is 5 mass ppm or more and 100 mass ppm or less, and
the carbon component detected in the surface region of the rare earth generator material particle has at least one selected from the group consisting of a C—C bond, a C—H bond, a C—O bond, a C—O bond, and an O—C=O bond.

2. The method according to claim 1, wherein the plurality of the regenerator material particle groups are filled in the regenerator container via a metal mesh material.

3. The method according to claim 2, wherein the metal mesh material is pressed to the regenerator material particle group filled in the regenerator container.

4. The method according to claim 1, wherein a metal mesh material is filled in a stage of the regenerator container.

5. The method according to claim 4, wherein a copper mesh material as the metal mesh material is filled in the regenerator container.

6. The method according to claim 1, wherein a plurality of the regenerator containers are prepared.

7. The method according to claim 6, wherein a copper mesh material is filled in at least one regenerator container out of the plurality of the regenerator containers.

8. The method according to claim 1, wherein the rare earth generator material particle comprises an intermetallic compound represented by a composition formula of RMa, wherein R is at least one element selected from the group consisting of rare earth elements, M is at least one element selected from the group consisting of Cu, Ni, and Co, and a is a number of an atomic ratio satisfying $0.1 \leq a \leq 4.0$.

9. The method according to claim 8, wherein a peak indicating a compound of the rare earth element and oxygen and a peak indicating a compound of the M element and oxygen are detected in the surface region by the X-ray, photoelectron spectroscopy analysis.

10. The method according to claim 8, wherein a ratio A/B of an atomicity A of the rare earth element in a compound of the rare earth element and oxygen to an atomicity B of the M element in a compound of the NI element and oxygen exceeds the value of the a.

11. The method according to claim 8, wherein the intermetallic compound comprises at least one selected from the group consisting of $HoCu_2$, HoCu, $Er_3Ni$, ErNi, and $Er_3Co$.

12. The method according to claim 1, wherein a lead regenerator material particle group as one group of the plurality of the regenerator material particle groups is filled in the regenerator container.

13. The method according to claim 1, wherein a gadolinium oxysulfide regenerator material particle group as one group of the plurality of the regenerator material particle groups is filled in the regenerator container.

14. The method according to claim 1, wherein the plurality of the regenerator material particle groups are filled in the regenerator container sequentially from the particle group with higher specific heat peak temperature.

15. The method according to claim 1, wherein an operating medium gas is passed through the regenerator container in which the regenerator material particle groups are filled in order to realize a temperature of 10 K or less.

16. The method according to claim 1, wherein the entire content of carbon in the rare earth generator material particle is 5 mass ppm or more and 50 mass ppm or less.

17. The method according to claim 1, wherein the regenerator material particle group is filled in the regenerator container while applying a vibration.

18. The method according to claim 1, wherein the cold head is mounted in a superconducting magnet, an examination apparatus, or a cryopump.

* * * * *